Jan. 7, 1969

C. W. CANNON 3,420,584

TRACK ROLLER SEAL

Filed March 18, 1966

Inventor
Craig W. Cannon
By Kenneth the Kirk
Attorneys

United States Patent Office 3,420,584
Patented Jan. 7, 1969

3,420,584
TRACK ROLLER SEAL
Craig W. Cannon, New Berlin, Wis., assignor to Allis-Chalmers Manufacturing Company, Milwaukee, Wis.
Filed Mar. 18, 1966, Ser. No. 535,461
U.S. Cl. 308—36.2    3 Claims
Int. Cl. F16c 33/74

ABSTRACT OF THE DISCLOSURE

A sealed bushing type bearing assembly for sealing track rollers on a crawler tractor. The seal includes a sealing ring rotating with the roller and a second sealing ring connected to the stator shaft and having biasing means forming a sealing surface between the rings.

---

Figures 1, 2:
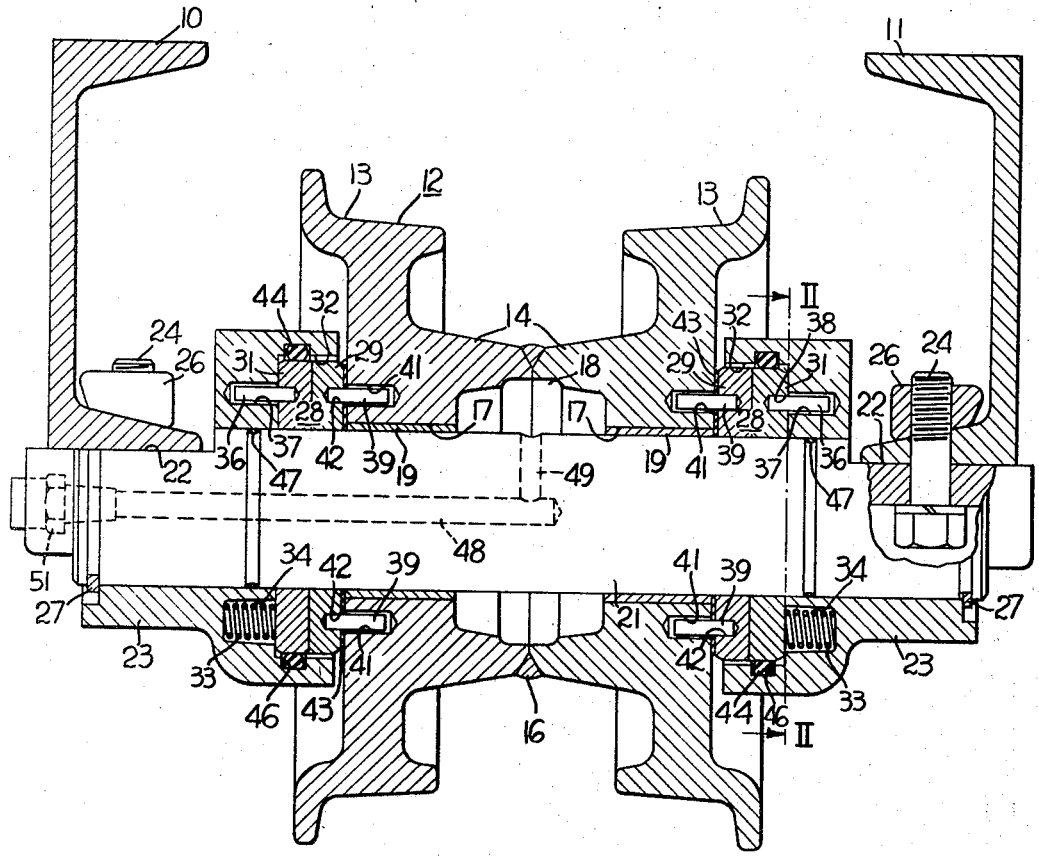

This invention relates to sealed bearings for connecting relatively rotatable parts in load transmitting and sealed relation with each other. More particularly, the invention is concerned with an improved bearing and seal assembly comprising a radial bearing and a combination axial contact seal and thrust bearing.

Seals of the present type are primarily provided for sealing the lubricating space containing bearings upon which the track rollers for the track of a crawler type tractor are mounted. Effective and durable seals are required for this purpose because the track rollers operate close to the ground in the dirt, mud and water. Bearing bushings which are used with track rollers are normally not capable of accommodating axial thrust loads. This has usually required a separate thrust bearing as well as a seal assembly to complete the track roller assembly.

It is a feature of the present invention to provide a track roller having sleeve bearings and an axial seal that also functions as a thrust bearing. This arrangement results in a relatively simple and inexpensive method of transmitting axial and thrust loads as well as sealing the bearing against the entry of foreign material.

The foregoing and other objects and advantages are attained by the present invention, various novel features of which will be appearant from the description herein and the accompanying drawing disclosing an embodiment of the invention, and will be more particularly pointed out in the appended claims.

Referring to the drawing:

FIG. 1 is a sectional view of a track roller installation for crawler tractors; and FIG. 2 is a partial end view on line II—II of FIG. 1.

Referring now to FIG. 1, the track roller forms part of a self-laying track unit which includes a relatively long frame extending at right angles to the roller axis of rotation and a series of track engaging rollers mounted on the frame. The frame includes a pair of transversely spaced side members in the form of channels 10 and 11. The rollers 12, only one of which is shown in the drawing, are located between the channels, and serve to support the track frame on the lower run of an endless track belt (not shown).

The roller or outer part 12 is conventional, being made up of two identical halves, each of which includes a flanged rim part 13 and a hub portion 14. The two halves of the roller are rigidly secured together by a welded seam 16 at the inner abutting ends of the hub portions 14, to form a unitary wheel structure with two transversely spaced hub openings 17 and a center lubricant chamber 18. Bearing bushings 19 are fixedly secured in the hub openings 17 and are adapted to rotate with the roller 12.

A supporting shaft or inner part 21 extends through the hub openings 17 of the roller 12 and is connected at its opposite ends with the lower flanges of the channels 10 and 11. Flats 22 are milled on the axle shaft 21 at its opposite ends to form seats for engagement with the lower sides of the side channels 10 and 11. Bracket members 23 embrace the end portion of the axle shaft 21. A pair of cap screws 24 extend through ear portions of the bracket member 23 and through the lower flange of the channels 10 and 11. The cap screws 24 are threaded into wedge blocks 26 to bring the flats 22 of the shaft into tight engagement with the channels 10 and 11. Axial movement of the shaft 21 relative to the brackets 23 is prevented by snap rings 27. It should now be apparent that the roller 12 is mounted on the shaft 21 for rotation relative to the frame members 10 and 11, axle shaft 21 and bracket members 23.

The brackets 23 serve two purposes, first as a mounting means for the axle shaft 21, and second as an annular supporting structure for an axial contact seal unit generally indicated by reference numeral 28. Each oil seal assembly includes a pair of ringlike steel sealing elements 29 and 31 received by a bore 32 and which are arranged to be received about shaft 21 and are adapted to abut one another. The abutting face of each element is properly finished to form a planar surface thereby resulting in an effective seal between faces. Element 29 is adapted to rotate with the roller 12 and element 31 is adapted to remain in a radially fixed position relative to shaft 21.

The stationary sealing element 31 is held in face-engaging relation to the rotating element 29 by a plurality of compression springs 33 and which springs are disposed in equidistantly spaced bores 34 formed in brackets 23. To prevent relative rotation of the sealing element 31 to the shaft 21, a plurality of pins 36 are provided with one end of each pin being disposed in a bore 37 in the bracket 23 and the other end of pin 36 being fixedly disposed in a bore 38 in element 31.

Similarly, the rotating sealing element 29 is held against rotation relative to the roller 12 by a plurality of pins 39 which are received by axially aligned bores 41 and 42 formed in the roller 12 and sealing element 29, respectively. A resilient gasket 43 is provided between the roller 12 and sealing element 29 to form a fluid tight seal. To coact with the sealing elements 29 and 31 to prevent the loss of lubricant, a sealing member 44, taking the form of an O-ring is received within a groove 46 provided interiorly of the bracket bore 32 to form a static seal between the periphery of the stationary sealing element 31 and the bracket bore 32. The cross section of the O-ring 44 is slightly larger than the groove 46 so that the O-ring is maintained under compression and thus provides a flexible deformable seal between the sealing element 31 and the bracket 23 which will permit the sealing element to move axially along the shaft 21 while still maintaining a sealing effect. An O-ring 47 is also provided between the axle shaft 21 and bracket 23 to prevent leakage of oil around the shaft.

The chamber 18 in the roller 12 contains a lubricant for the bearings 19. This lubricant can be injected into chamber 18 through an axially extending passage 48 and a communicating radial passage 49, both of these passages being formed in shaft 21. A suitable fluid pressure fitting 51 is threadably connected to the end of shaft 21 so that it communicates with passage 48.

From the foregoing it should be understood that thrust loads on roller 12 are transmitted to track roller frames 10 and 11 through the sealing elements 29 and 31 and bracket members 23. Any end play due to wear is taken up by the springs 33.

It should also be understood that the invention could be practiced by a reversal of parts with the springs 34 positioned in roller 14 and the O-ring internal groove 46 contained in an added portion (not shown) of roller 14 and with the compressible gasket 43 positioned between the bracket 23 and the outer ring 31.

The embodiments of the invention in which an exclusive property or privilege is claimed are defined as follows:

1. In combination with a pair of relatively rotatable radially inner and outer parts defining a bearing including a bushing connected to said outer part for rotation on said inner part, an axial contact seal unit at one side of said bearing comprising, a resilient gasket positioned with one side thereof adjacent one end of said bearing for rotation with said outer part and said bushing, a first sealing ring biased to engage said gasket, pin means connecting said ring and gasket for rotation with said outer part, a second sealing ring positioned in axial contact with the other side of said first sealing ring and being axially shiftable, a bracket member attached to said inner part and said second sealing ring in surrounding relation to said rings, a seal element intermediate said bracket member and said inner part, said bracket defining a radial inner groove about said second sealing ring, an O-ring positioned in said groove for providing a seal between said bracket and said second sealing ring, and means carried by said bracket for biasing said second ring axially into face engaging contact with said first sealing ring to provide a seal between said rings.

2. The combination as recited in claim 1 and wherein lubricating means are provided adjacent the other end of said bearing for lubricating same.

3. The combination as recited in claim 2 and wherein said bracket member provides the connection between said second ring and said inner part.

References Cited

UNITED STATES PATENTS

| | | | |
|---|---|---|---|
| 2,480,908 | 9/1949 | Davies | 277—96 |
| 3,021,182 | 2/1962 | Schnacke | 277—81 X |

FREDERICK L. MATTESON, *Primary Examiner.*

R. A. DUA, *Assistant Examiner.*

U.S. Cl. X.R.

277—96